US012621145B1

(12) United States Patent

Trulli, Jr. et al.

(10) Patent No.: US 12,621,145 B1

(45) Date of Patent: May 5, 2026

(54) STORAGE-BASED SECURE COMMUNICATION WITH A PHYSICAL CYBER RECOVER VAULT

(71) Applicant: Dell Products, L.P., Hopkinton, MA (US)

(72) Inventors: Dennis J. Trulli, Jr., Hudson (BE); Peter Callewaert, Eernegem (BE)

(73) Assignee: Dell Products, L.P., Hopkinton, MA (US)

( * ) Notice: Subject to any disclaimer, the term of this patent is extended or adjusted under 35 U.S.C. 154(b) by 48 days.

(21) Appl. No.: 18/938,459

(22) Filed: Nov. 6, 2024

(51) Int. Cl.
*G06F 21/00* (2013.01)
*H04L 9/08* (2006.01)
*H04L 9/32* (2006.01)

(52) U.S. Cl.
CPC .......... *H04L 9/0894* (2013.01); *H04L 9/3247* (2013.01)

(58) Field of Classification Search
CPC ............................ H04L 9/0894; H04L 9/3247
See application file for complete search history.

(56) References Cited

U.S. PATENT DOCUMENTS 6,754,349 B1 * 6/2004 Arthan .................. H04L 9/0894
726/20
9,680,805 B1 * 6/2017 Rodgers .................. G06F 16/84

| | | | | |
|---|---|---|---|---|
| 11,831,759 | B1 * | 11/2023 | Valkaitis | ................ H04L 9/0866 |
| 12,167,236 | B2 * | 12/2024 | Sullivan | .................. H04L 9/085 |
| 12,217,252 | B2 * | 2/2025 | Dikhit | ................... H04L 63/083 |
| 12,259,996 | B2 * | 3/2025 | Chiu | ...................... H04L 9/0825 |
| 2018/0034632 | A1 * | 2/2018 | De Atley | ............... G06F 21/00 |
| 2018/0323970 | A1 * | 11/2018 | Maron | ................. H04L 9/0891 |
| 2021/0281418 | A1 * | 9/2021 | Abadir | ................. H04L 9/3234 |
| 2023/0262034 | A1 * | 8/2023 | Mitter | ................ G06F 21/6218 |
| | | | | 713/150 |
| 2024/0080189 | A1 * | 3/2024 | Li | ......................... H04L 9/0863 |

FOREIGN PATENT DOCUMENTS

EP 3349393 B1 * 6/2024 ......... H04L 63/0428

* cited by examiner

*Primary Examiner* — Kendall Dolly

(74) *Attorney, Agent, or Firm* — Anderson Gorecki LLP

(57) ABSTRACT

A storage-based secure communication system enables communication between a production site and a cyber recovery vault on a data replication facility. A control file is created in a controller-based file system that is accessible to both the production site and the cyber recovery vault. A communication subtask at the production site writes heartbeat and control information to the control file, encrypts the control file using the cyber recovery vault's public key, and digitally signs the control file using the production site's private key. A communication subtask at the cyber recovery vault reads the control file, decrypts the control file using the cyber recover vault's private key, and verifies the digital signature using the production site's public key. If the control file is determined to be valid, the control information contained in the control file is used to update the configuration of the cyber recovery vault on the data replication facility.

20 Claims, 7 Drawing Sheets

Figure 3:
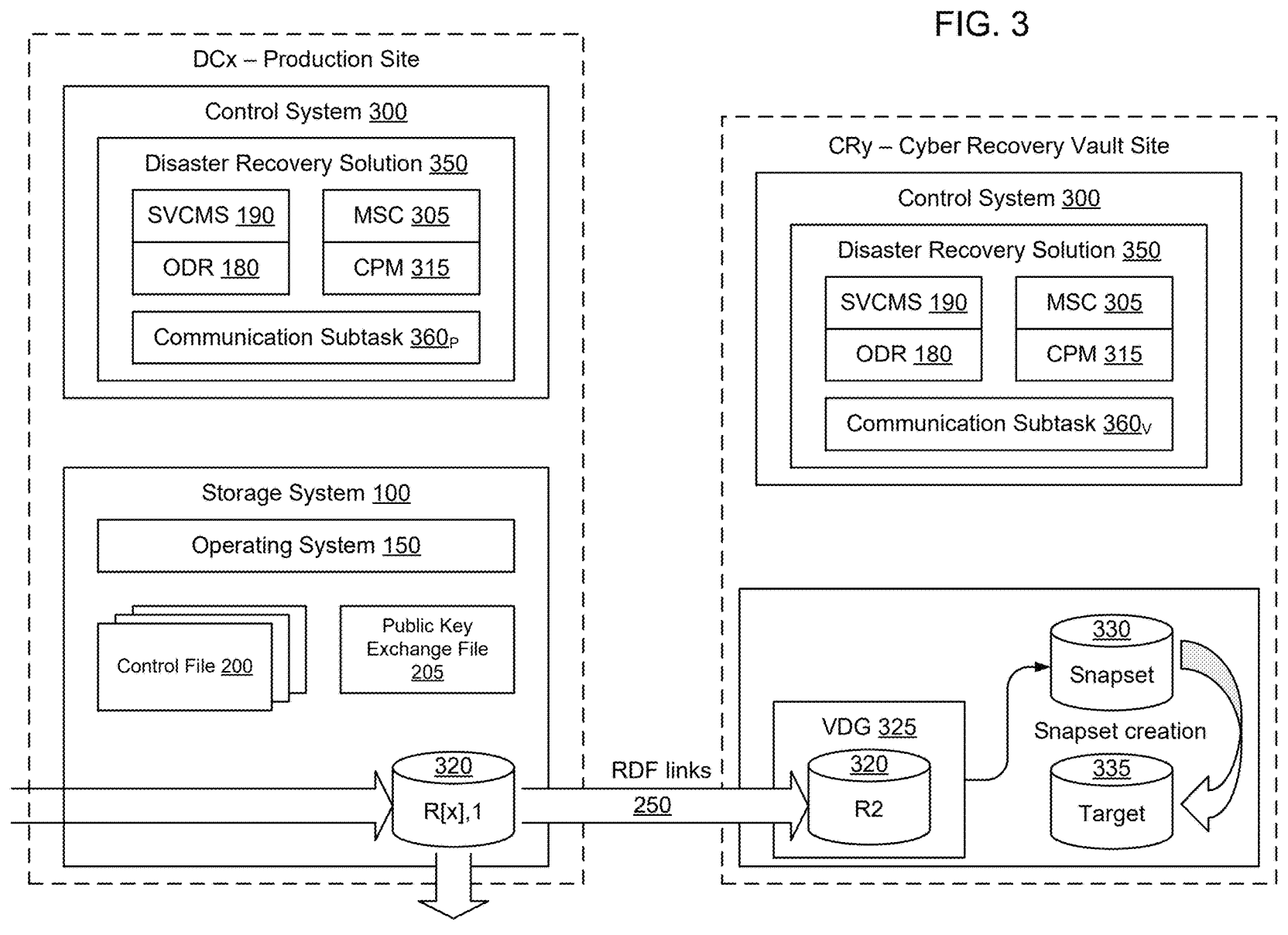

CRy – Cyber Recovery Vault Site

Control System 300

Disaster Recovery Solution 350

SVCMS 190

MSC 305

ODR 180

CPM 315

Communication Subtask 360ᵥ

Snapset 330

Snapset creation

Target 335

VDG 325

R2 320

RDF links 250

DCx – Production Site

Control System 300

Disaster Recovery Solution 350

SVCMS 190

MSC 305

ODR 180

CPM 315

Communication Subtask 360ₚ

Storage System 100

Operating System 150

Public Key Exchange File 205

Control File 200

Figure 5:
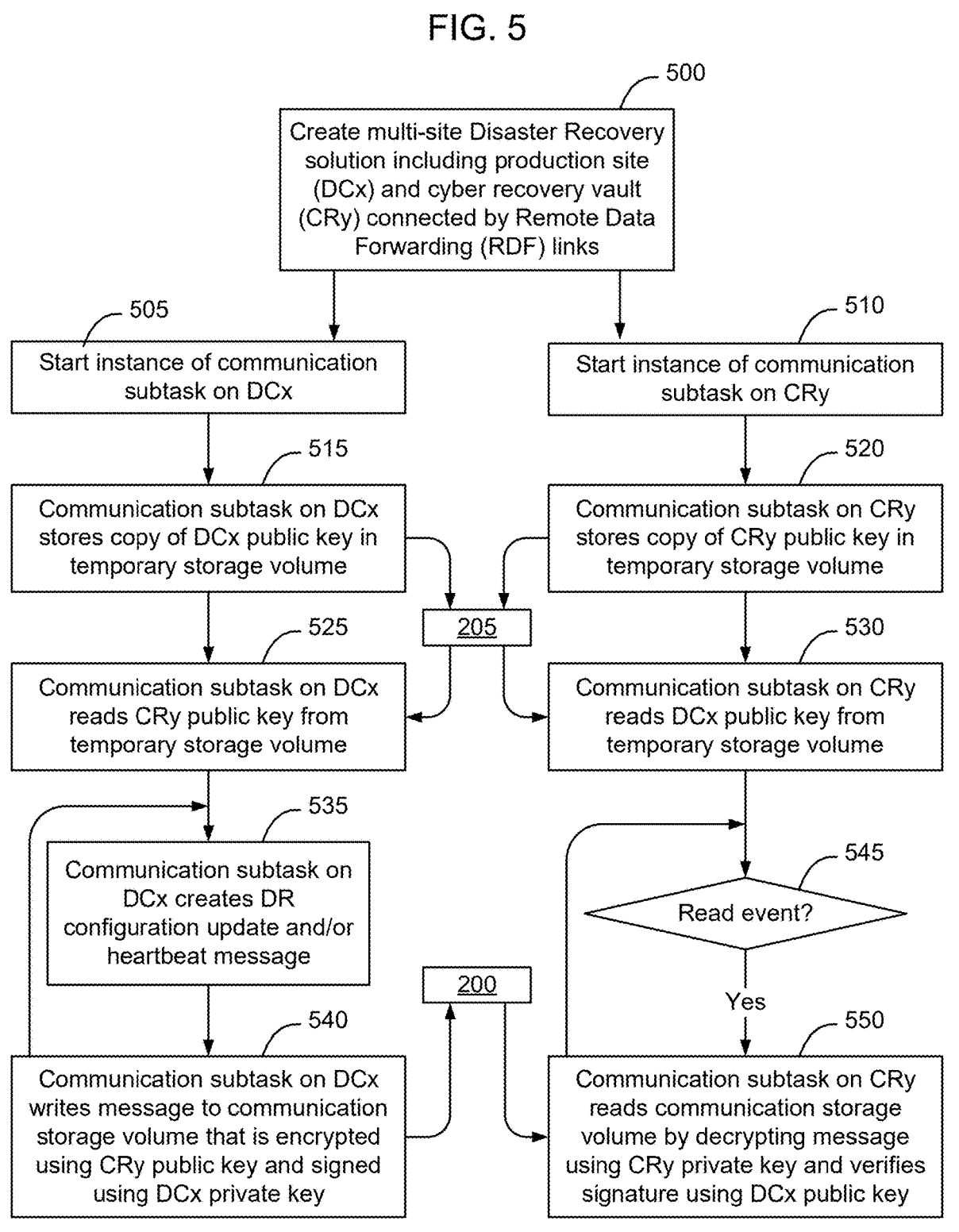

Create multi-site Disaster Recovery solution including production site (DCx) and cyber recovery vault (CRy) connected by Remote Data Forwarding (RDF) links

505

Start instance of communication subtask on DCx

510

Start instance of communication subtask on CRy

515

Communication subtask on DCx stores copy of DCx public key in temporary storage volume

520

Communication subtask on CRy stores copy of CRy public key in temporary storage volume

205

525

Communication subtask on DCx reads CRy public key from temporary storage volume

530

Communication subtask on CRy reads DCx public key from temporary storage volume

535

Communication subtask on DCx creates DR configuration update and/or heartbeat message

545

Read event?

200

540

Communication subtask on DCx writes message to communication storage volume that is encrypted using CRy public key and signed using DCx private key Yes

550

Communication subtask on CRy reads communication storage volume by decrypting message using CRy private key and verifies signature using DCx public key

FIG. 7

STORAGE-BASED SECURE COMMUNICATION WITH A PHYSICAL CYBER RECOVER VAULT

FIELD

This disclosure relates to computing systems and related devices and methods, and, more particularly, to storage-based secure communication with a physical cyber recovery vault.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

According to some embodiments, storage-based secure communication with a physical cyber recovery vault operates to enable communication between a production site and a cyber recovery vault on a data replication facility without requiring TCP/IP connectivity between the production site and cyber recovery vault. In some embodiments, the storage-based secure communication includes a control file in an accessible file system of the production site. The term file system, as used herein, refers to a logical or physical system for organizing, managing, and accessing files and directories on a device's solid-state drive (SSD), hard-disk drive (HDD), or other storage media. The production site and cyber recovery vault exchange public keys of respective public/private encryption key pairs. A communication subtask at the production site writes heartbeat and control information to the control file and encrypts the control file using the cyber recovery vault's public key. The communication subtask at the production site also signs the control file using the production site's private key. A communication subtask at the cyber recovery vault reads the control file, decrypts the control file using the cyber recover vault's private key, and verifies the signature of the control file using the production site's public key. In response to a determination that the control file is valid, the control information contained in the control file is used to update the configuration of the cyber recovery vault on the data replication facility.

In some embodiments, a method of using a storage-based secure communication system to communicate between a production site and a cyber recovery vault on a data replication facility, includes writing control information to a control file by a first communication subtask on the production site, encrypting the control file, by the first communication subtask on the production site, using a cyber recovery vault public key, to create an encrypted control file, and digitally signing the encrypted control file, by the first communication subtask on the production site, using a production site private key to create a control file digital signature. The method also includes reading the encrypted control file by a second communication subtask on the cyber recovery vault, decrypting the encrypted control file, by the second communication subtask on the cyber recovery vault, using a cyber recovery vault private key, to recreate the control file, and verifying the control file digital signature, by the second communication subtask on the cyber recovery vault, using a production site public key. The method also includes, in response to a determination that the control file digital signature is valid and that the control file is able to be recreated by decrypting the encrypted control file using the cyber recovery vault private key, implementing control operations on the cyber recovery vault in accordance with control information contained in the control file.

In some embodiments, the control file is a set of one or more files implemented in a controller-based file system. In some embodiments, the controller-based file system is an accessible file system that is accessible by both the production site and the cyber recovery vault, and communication between the production site and the cyber recovery vault is restricted to remote data forwarding links between a storage system at the production site and a storage system at the cyber recovery vault site. In some embodiments, the controller-based file system is implemented on the production site. In some embodiments, the controller-based file system is implemented on the cyber recovery vault.

In some embodiments, the method further includes implementing public key exchange between the production site and the cyber recovery vault, the public key exchange including writing the production site public key by the first communication subtask on the production site to a key exchange file in the controller-based file system, writing the cyber recovery vault public key by the second communication subtask on the cyber recovery vault to the key exchange file in the controller-based file system, reading the cyber recovery vault public key by the first communication subtask on the production site from the key exchange file in the controller-based file system, and reading the production site public key by the second communication subtask on the cyber recovery vault from the key exchange file in the controller-based file system. In some embodiments, the method further includes deleting the key exchange file after implementing the public key exchange between the production site and the cyber recovery vault.

In some embodiments, the control information specifies a data replication modality to be used to transmit data on a set of one or more remote data forwarding links between the production site and the cyber recovery vault on the data replication facility, and implementing control operations on the cyber recovery vault in accordance with control information contained in the control file comprises changing the data replication modality used to transmit data on the set of one or more remote data forwarding links to match the control information.

In some embodiments, the method further includes creating snapsets of storage volumes in the cyber recovery vault at a predetermined cadence, and in response to a determination that the control file digital signature is not valid or that the control file is not able to be recreated by decrypting the encrypted control file using the cyber recovery vault private key, pausing creation of the snapsets of the storage volumes in the cyber recovery vault.

In some embodiments, the control information further contains heartbeat information, and the method further includes creating snapsets of storage volumes in the cyber recovery vault at a predetermined cadence, determining whether a recent portion of the heartbeat information is absent from the control information and, in response to a determination that the recent portion of the heartbeat information is absent from the control information, pausing creation of the snapsets of the storage volumes in the cyber recovery vault.

BRIEF DESCRIPTION OF THE DRAWINGS

FIG. 2 is a block diagram of a storage environment including four Data Centers (DC) arranged in a square data replication facility, and including one or more Cyber Recovery (CR) vault sites, according to some embodiments.

FIG. 3 is a block diagram of an example production site DCx configured to enable storage-based secure communication with a physical cyber recovery vault CRy, in which the storage-based secure communication system is hosted by the production site DCx, according to some embodiments.

FIG. 4 is a block diagram of the example production site and cyber recovery vault site of FIG. 3, and showing example ways of communicating between the production site DCx and cyber recovery vault CRy using a storage-based secure communication system, according to some embodiments.

FIG. 5 is a flow chart of an example method of using storage-based secure communication system to enable communication between a production site DCx and a cyber recovery vault CRy, according to some embodiments.

FIG. 7 is a block diagram of an example production site DCx configured to enable storage-based secure communication with a physical cyber recovery vault CRy, in which the storage-based secure communication system is hosted by the cyber recovery vault CRy, according to some embodiments.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic"

is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
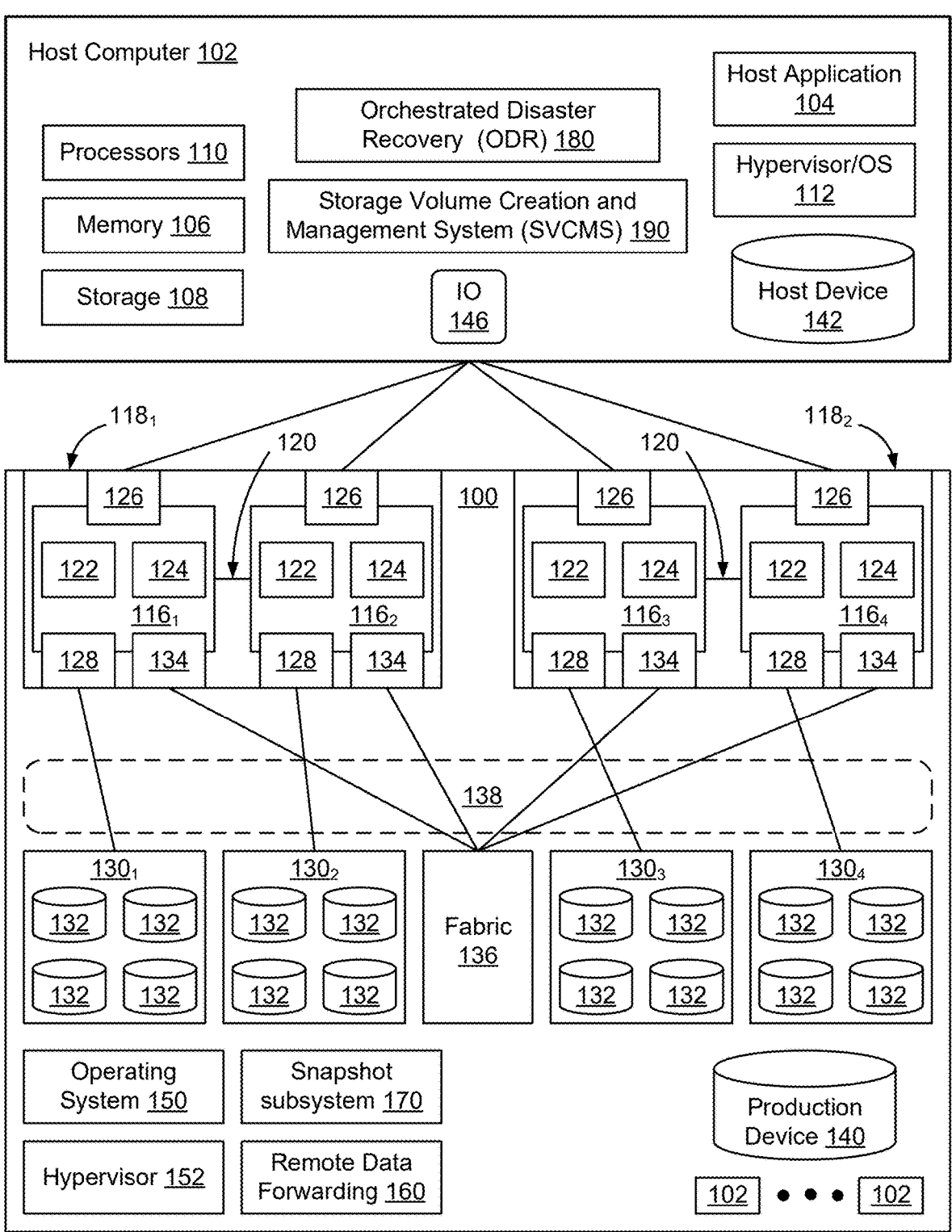
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more front end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access).

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. In some implementations, from the perspective of the host application 104, the host device 142 is a single data storage device having a set of contiguous fixed-size LBAs (Logical Block Addresses) on which data used by the host application 104 resides and can be stored. The data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host local volatile memory 106. If that is not possible then the IO 146 is sent to one of the compute nodes 116 to be serviced by the storage system 100.

In the case where IO 146 is a read command, the storage system 100 uses metadata to locate the commanded data, e.g. in the virtual shared global memory 138 or on managed drives 132. If the commanded data is not in the virtual shared global memory 138, then the data is temporarily copied into the virtual shared global memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared global memory 138, marks the data as dirty, and creates metadata that maps the address of the data at the production device 140 to a location to which the block is written on the managed drives 132.

Hosts 102, such as mainframe (zOS) computer systems, store data using storage resources of the storage systems 100. Software, such as an Orchestrated Disaster Recovery (ODR) application 180 is used to automate, react, and monitor large scale mainframe and mixed mainframe-open systems environments, to provide continuous operations or automated failover during planned or unplanned events. One example commercially available ODR application 180 is referred to as Geographically Dispersed Disaster Recovery (GDDR) which is available from Dell™, although the techniques described herein can be used in connection with other forms of ODR applications 180. Although some embodiments will be described using GDDR as an example implementation of an ODR application 180, it should be understood that the techniques described herein can be used in other environments as well.

In some embodiments, ODR application 180 is a mainframe software product that automates business recovery procedures by reacting to events that its monitoring capability detects in a data center. Because the ODR application 180 is designed to provide system restart following disasters, ODR application 180 does not reside in the same systems that it is seeking to protect. Rather, ODR application 180 resides on separate logical partitions from those that run application workloads.

In some embodiments, ODR application 180 works in connection with remote data forwarding subsystem 160 of storage system 100 to create data replication facilities between pairs of similarly configured storage systems 100. Replication of data on a data replication facility will be referred to herein as remote data forwarding (RDF). As described in greater detail herein, in some embodiments one of the storage systems, that is configured to implement cyber protection as a cyber recovery vault CRy, includes a snapshot subsystem 170 configured to create point in time copies of storage volumes upon achievement of consistency with a respective data center. A snapshot of a storage volume, such as production device 140, is a point-in-time copy of the storage volume as the storage volume existed at the time when the snapshot was created.

In some embodiments, host computer runs a mainframe software application configured to manage creation and management of storage volumes and to interact with the storage systems 100 that are providing storage resources to the host computer 102, to ensure that the storage systems 100 are correctly configured to provide continuous data protection for mainframe data assets. For example, as shown in FIG. 1, in some embodiments the host computer includes Storage Volume Creation and Management System (SVCMS) 190 that is configured to interact with storage system 100 to cause the snapshot subsystem 170 of storage system 100 to create snapshots of storage volumes 320 that are used by host computer 102 and are stored in the cyber recovery vault on a regular cadence.

In some embodiments, SVCMS 190 interacts with the storage system 100 that is being used as the cyber recovery vault to create a versioned data group 325 of the storage volumes 320 that are contained in the cyber recovery vault that are to be backed up. SVCMS 190 also interacts with the snapshot subsystem 170 of the storage system 100 to cause the snapshot subsystem 170 to create snapsets 330 (groups of snapshots) of the storage volumes 320 of the versioned data group 325. In this way, the mainframe host 102 can control creation of snapsets of volumes of data by the snapshot subsystem 170 within the cyber recovery vault CRy, to create point in time recovery points of the set of storage volumes stored in the cyber recovery vault CRy. Optionally, snapsets 330 may be linked to a target set of devices 335 within the cyber recovery vault CRy.

In some embodiments, as shown in FIG. 1, one application that may be executing on storage system 100 is a Remote Data Forwarding (RDF) application process 160, which causes selected storage volumes to be mirrored by the storage system 100 to one or more similar backup storage systems 100.

It is possible for a primary storage system 100 (R1) to perform data replication to a backup storage system 100 (R2) where the storage systems 100 are compatible and properly configured. The RDF application 160, when executed on storage system 100, enables the storage system 100 to participate in storage system level data replication between sets of mirroring pairs of storage systems 100. A set of storage systems 100 that are configured for data to be mirrored from a primary storage system 100 (R1) to a backup storage system 100 (R2) will be referred to herein as a "Data Replication Facility". A given storage system, such as storage system 100, may operate as a primary storage system 100 R1 or backup storage system 100 R2 in many mirroring pairs, and hence multiple RDF applications 160 may simultaneously execute on storage system 100 to control participation of the storage system 100 in the mirroring operations. In some embodiments, one or more of the backup storage systems 100 R2 is implemented as a physical cyber recovery vault CRy.

Data transfer among storage systems, including transfers between storage systems 100 for data replication (mirroring) functions, may take place in several ways depending on how the primary storage system R1 handles data written by the host 102 and how the backup storage system R2 acknowledges receipt of data on the data replication facility. Three example data mirroring modes will be referred to herein as synchronous data replication mode (RDF/S), asynchronous data replication mode (RDF/A), and Adaptive Copy Disk data replication mode (ADCOPY-DISK).

In synchronous data replication mode (RDF/S), data is transmitted from the primary storage system R1 to the backup storage system R2 as the data is received from the host 102, and an acknowledgement of a successful write is transmitted by the backup storage system R2 synchronously with the completion thereof. To maintain a synchronous relationship between the primary storage system R1 and the backup storage system R2, each IO from the host 102 is forwarded by the primary storage system R1 to the backup storage system R2 as it is received from host 102, and the primary storage system R1 will wait for an acknowledgment from the backup storage system R2 before issuing a subsequent IO from the host 102.

In asynchronous data replication mode (RDF/A), when data is received from the host 102, the data is written to the primary storage system R1 and a data transfer process is initiated to write the data to the backup storage system R2 on the data replication facility. The primary storage system R1 acknowledges the write operation to the host 102 before the primary storage system R1 has received an acknowledgement that the data has been received by the backup storage system R2. The use of asynchronous data replication RDF/A enables the data on the primary storage system R1 and backup storage system R2 to be one or more cycles out of synchronization, because the primary storage system R1 will continue to execute IOs prior to receipt of acknowledgments from the backup storage system R2. The use of asynchronous replication RDF/A may be beneficial in connection with sites located geographically distant from each other, for example where the distance between the primary storage system R1 and the backup storage system R2 is such that waiting for an acknowledgement from the backup storage system R2 would take considerable time and, hence, reduce responsiveness of the primary storage system R1 to the host 102.

Adaptive Copy Disk (ADCOPY-DISK) data replication mode, as that term is used herein, refers to an asynchronous type of data replication in which data is transmitted from the primary storage system R1 to the backup storage system R2 using a best-efforts type of data replication between the storage systems. In ADCOPY-DISK, the data on the backup storage system R2 may be more than one IO out of synchronization with the primary storage system R1 and, accordingly, data consistency at the backup storage system R2 is not guaranteed. ADCOPY-DISK enables bulk copy operations to be implemented between the primary storage system R1 and the backup storage system R2, for example when there are many tracks to synchronize between the two storage systems.

Figure 2:
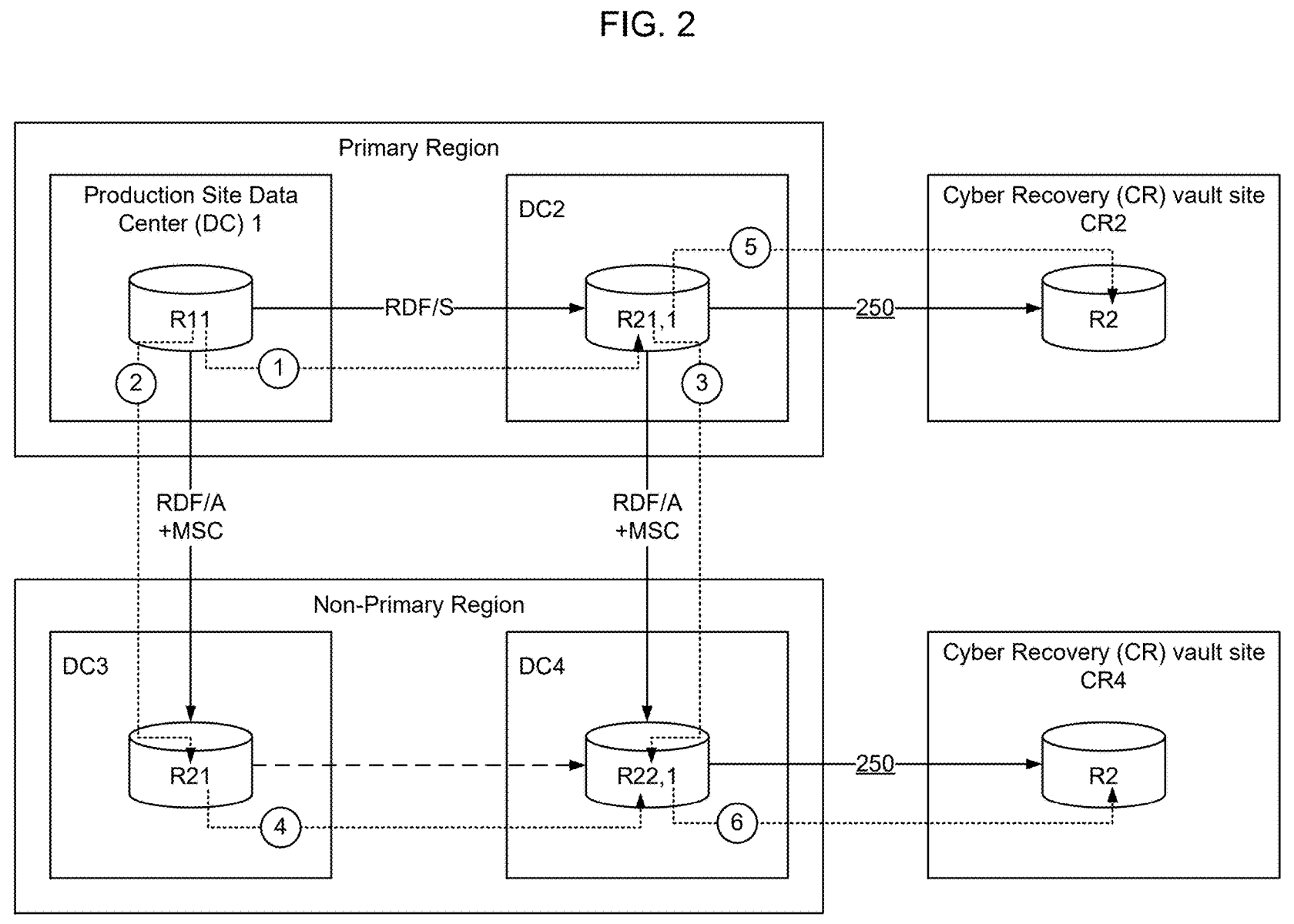

There are many types of data replication facilities that may be created, which may have different topographies depending on the number of data centers and the manner in which data is configured to be replicated between the data centers. For example, FIG. 2 is a block diagram of an example storage environment including four Data Centers (DC1, DC2, DC3, and DC4) that are arranged in a square data replication facility that also includes one or more Cyber Recovery (CR) vault sites, according to some embodiments. Although some embodiments are described herein in which the data replication facility is implemented using a square topography, it should be understood that other topographies may be used as well depending on the particular implementation.

In the nomenclature adopted in the figures, the letter "R" is used to refer to one or more storage volumes that has been included in a data replication facility, such that data that is written to one or more of the storage volumes will be replicated on the data replication facility. The numbers following the letter R indicate if the storage volume is a source (designated by a number 1) or a receiver (designated by the number 2). In FIG. 2, the square topography of the data replication facility includes a first pair of data centers, DC1 and DC2, in a primary region and a second pair of data centers, DC3 and DC4, in a non-primary region.

In some embodiments, the storage systems are configured such that a cascaded data replication facility is able to include RDF/S data replication on the first leg and either RDF/A data replication or ADCOPY-DISK data replication on the second leg, or to use RDF/A data replication on the first leg and ADCOPY-DISK on the second leg. However, in some embodiments, the storage systems are configured to not allow creation of a cascaded data replication facility on which RDF/A data replication is used on both the first and second leg of the cascaded data replication facility. For example, in the data replication facility shown in FIG. 2, production site data center DC1 is the source (R11) on both a first replication session to data center DC2 (Arrow 1) and on a second replication session to data center DC3 (Arrow 2). Synchronous replication is used to replicate data between the data centers in the primary region (on Arrow 1 from DC1 to DC2) and asynchronous data replication RDF/A is used to replicate data between the primary and non-primary regions (on Arrow 2 from DC1 to DC3). DC2 likewise replicates data received from DC1 in a cascaded manner to DC4 over an asynchronous data replication session (Arrow 3). Further, within the non-primary region, a recovery leg is implemented between DC3 and DC4 and, as such, no replication is running between these two sites normally (Arrow 4). Hence, in FIG. 2, the square data replication facility includes the following data replication sessions:

DC1→DC2 (Arrow 1: synchronous remote data forwarding RDF/S)

DC1→DC3 (Arrow 2: asynchronous remote data forwarding RDF/A)

DC2→DC4 (Arrow 3: asynchronous remote data forwarding RDF/A)

DC3→DC4 (Arrow 4: Recovery leg)

In some embodiments, orchestrated disaster recovery application 180 is used to configure the data replication facility to enable data to be mirrored between storage systems DC1, DC2, DC3, and DC4 so that, in the event of a failure of one of the storage systems, the data remains available at one or more of the other storage systems. It should be noted that the same set of storage volumes, that originate at DC1, are replicated on each of the replication sessions (Arrows 1, 2, and 3). In the event of a failure, the orchestrated disaster recovery application 180 enables failover from one storage system to another of the storage systems of the data replication facility. Although FIG. 2 shows a square-shaped data replication facility, it should be understood that data replication facilities can have different numbers of storage systems and different architectures depending on the implementation.

In FIG. 2, a Cyber Recovery (CR) vault site is connected by a replication facility (Arrow 5) with one of the production sites DC2, which is the source of production data that is to be protected using the cyber recovery vault CR2. In FIG. 2, production site DC2 is connected by a data replication facility (Arrow 5) to a cyber recovery vault CR2, although cyber recovery vault CR2 may be connected to any production site DCx. In some embodiments, Cyber Protection Automation (CPA) is implemented using Orchestrated Disaster Recovery application 180, to create copies of data at a cyber recovery vault site CRy that can be used for cyber recovery, for example in instances where the data maintained by the storage systems implementing the data replication facility is corrupted in a malware attack. In some embodiments, the storage volume creation and management system (SVCMS) 190 is used to create regular snapsets at the cyber recovery vault CR2, which is a physically separate, possibly airgapped, cyber recovery vault CR2 using a Cyber Protection Automation (CPA) process. Likewise, in FIG. 2, production site DC4 is connected by a data replication facility (Arrow 6) to a second cyber recovery vault CR4, although the second cyber recovery vault CR4 may be connected to any production site DCx.

An airgap, as that term is used herein, refers to the relative isolation of the storage system implementing the cyber recovery vault CRy from the production site DCx. As shown in FIG. 2, in some embodiments the production site DCx and cyber recovery vault CRy are connected by RDF links 250. In an airgapped solution, these RDF links 250 are normally offline, making data flow impossible. When an airgap connection is enabled, data flow is possible and the RDF links are online. When an airgap connection is disabled, data flow is not possible because the RDF links are offline. By using an airgap, it is possible to physically isolate the cyber recovery vault CRy from the production sites DCx of the data replication facility. In some embodiments, the cyber recovery vault CRy controls the state of the airgap on RDF links 250 to selectively toggle the RDF links 250 between online and offline states.

In some embodiments, when the airgap is closed, consistency is achieved between the storage volumes 320 at the production site DCx and the storage volumes 320 at the cyber recovery vault CRy. After consistency is achieved, a snapset 330 of the storage volumes of the versioned data group 325 is created in the cyber recovery vault CRy. Optionally, once created, the snapset 330 may be linked to a target set of devices 335 in the cyber recovery vault CRy. U.S. patent application Ser. Nos. 18/632,514, 18/655,449, and 18/794,036, describe several methods of creating snapshots of the storage volumes in the cyber recovery vault CRy, depending on the modality (RDF/A with Multi-Session Consistency (MSC) or ADCOPY-DISK) being used to transmit data to the cyber recovery vault CRy on RDF links 250. The content of each of these patent applications is hereby incorporated by reference in their entirety.

The production site, DCx, is a regular Orchestrated Disaster Recovery (ODR) production site as part of any ODR configuration. In some embodiments, ODR application 180 runs at the production site as a control system (C-system). The production site DCx houses the Storage Volume Creation and Management System (SVCMS) source devices 320 included in the cyber RDF groups. It supports all documented ODR features, including Versioned Data Group (VDG) protection for the RDF source devices 320. In the examples shown in FIGS. 3 and 4, the source devices 320 on the production site DCx are the source of either MSC-controlled RDF/A or ADCOPY-DISK in their role as SVCMS source devices 320 on a data replication facility between the production site DCx and the cyber recovery vault CRy. Any change to the modality being used to transmit data between the production site DCx and the cyber recovery vault CRy will be communicated as control information by the disaster recovery solution 350 using communication subtask 360$_P$, which is described in greater detail below.

As used herein, CRy is the cyber recovery vault site. The cyber recovery vault CRy houses the cyber protection automation target devices 320. In some embodiments, an instance of Orchestrated Disaster Recovery (ODR) 180 such as Geographically Dispersed Disaster Restart (GDDR) is run in the cyber recovery vault CRy. In some embodiments, the instance of ODR 180 executing in the cyber recovery vault CRy is configured to regularly exchange configuration and state information with ODR 180 running at the production site, in order to determine which space-saving cyber protection automation modality is being implemented on the RDF links 250. Example modalities include asynchronous RDF (RDF/A) with MSC, and ADCOPY-DISK.

In some embodiments, Cyber Protection Manager (CPM) is started in the cyber recovery vault CRy. In some embodiments, if the RDF links 250 are to be turned on/off in connection with formation of an airgapped solution, the CPM is configured to control operation of the RDF links 250 to alternately activate and deactivate the RDF links 250 in conformance with the specified airgap schedule.

In some embodiments, Multi Session Consistency (MSC) 305 is used to achieve global consistency between the storage volumes at the production site DCx and the cyber recovery vault CRy when asynchronous RDF is being used to transmit data on the RDF links 250.

In some embodiments, the Storage Volume Creation and Management System (SVCMS) 190 is configured to manage the cyber protection automation snapsets. One example SVCMS application is referred to as Data Protector for z Systems (zDP) available from Dell™, although other SVCMS applications may be used as well depending on the implementation. In some embodiments, SVCMS is configured to create CRy snapsets created from the cyber recovery vault R2 volumes in the cyber recovery vault storage system and optionally link the created snapshots to sets of target devices 335.

In some disaster recovery solution configurations, control information would be passed between the production site DCx and the cyber recovery vault CRy using a control channel other than the RDF links 250. For example, in some instances control information such as configuration and state information, and information required to manage the overall solution, would be passed between the production site DCx and the cyber recovery vault CRy using an external communication channel such as a TCP/IP connection between the host at the CPA source site and a host at cyber recovery vault site. This TCP/IP connection facilitated the exchange of configuration and state information as well as would be used to manage the overall disaster recovery solution.

Unfortunately, using an external communication channel such as a TCP/IP connection may create a cyber risk by providing exposure to rogue actors outside of the cyber recovery vault CRy. Specifically, there is a concern that a rogue actor outside of the cyber recovery vault CRy could exploit this TCP/IP connectivity to interfere with the cyber protection automation offered by the cyber recovery vault CRy. According to some embodiments, a storage-based secure communication mechanism is provided between the host at the CPA source site and the host at the cyber recovery vault site without the need for TCP/IP connectivity or another type of external communication channel. By eliminating the need for TCP/IP connectivity between a host at the production site DCx and a corresponding host at the cyber recovery vault CRy, it is possible to eliminate this potential vulnerability thus increasing the overall security of the disaster recovery solution.

Figure 4:
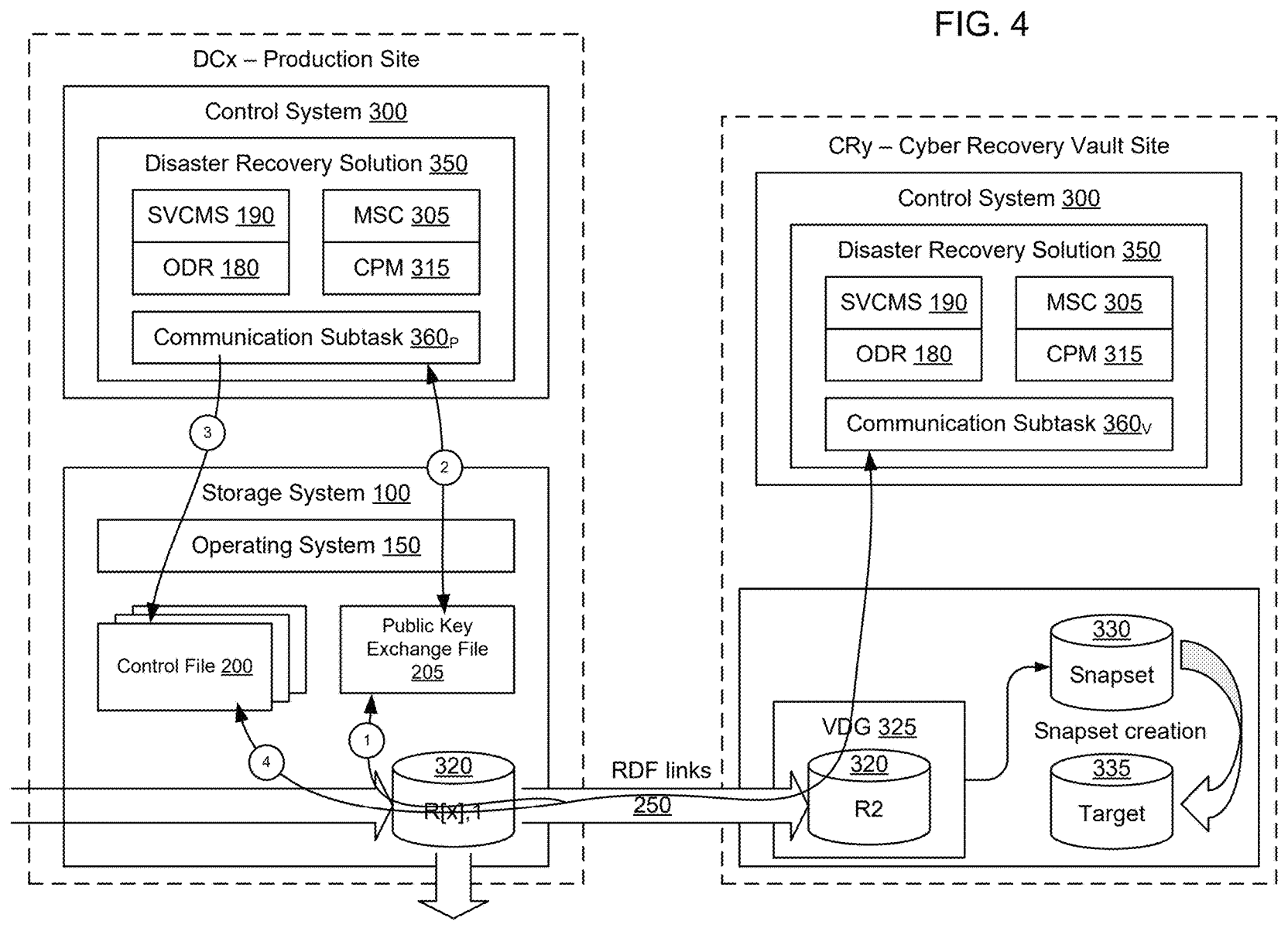
Figure 7:
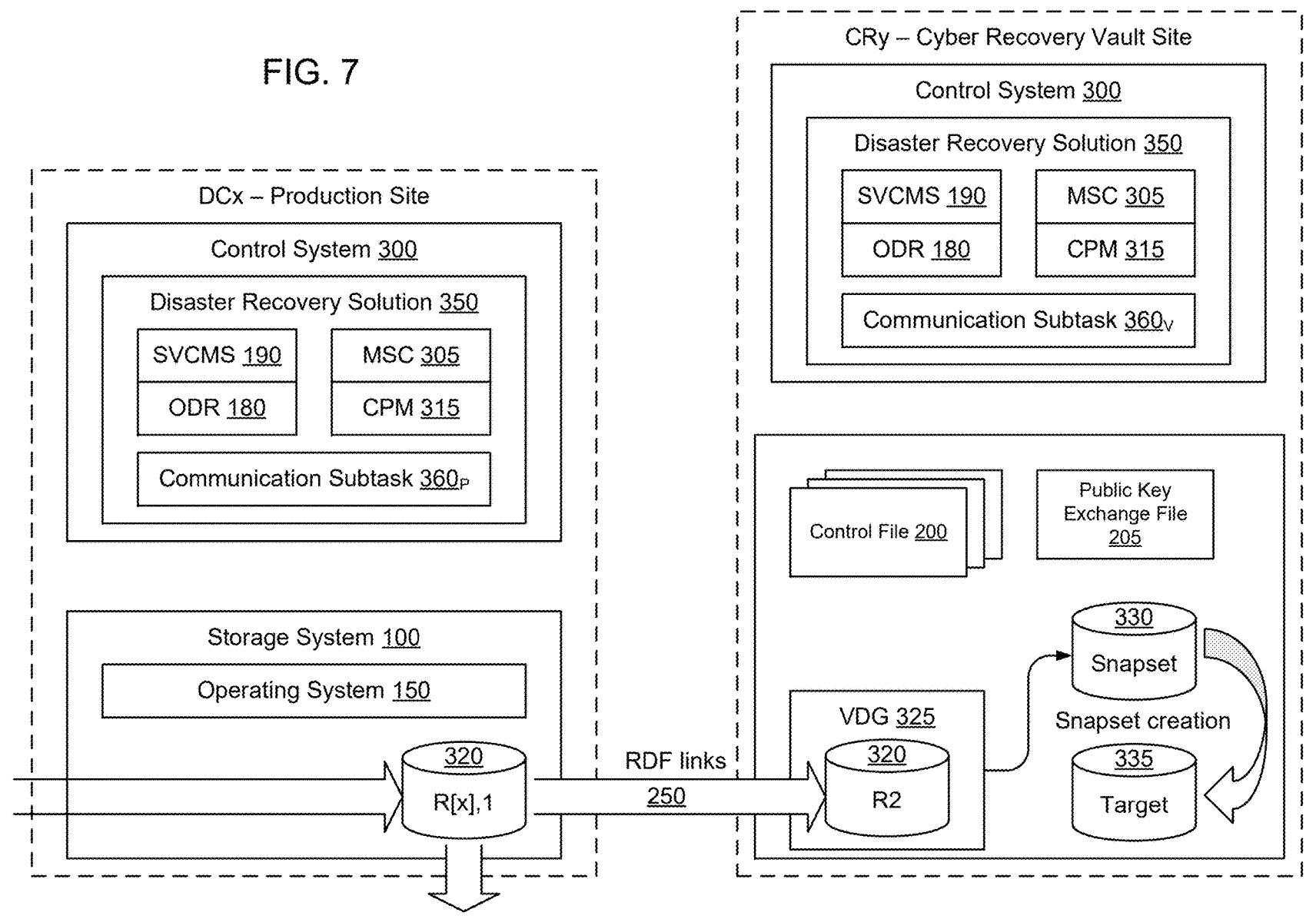

Disaster recovery (DR) solutions, whether implemented on mainframe or open systems, may want to exploit a storage-based secure communication mechanism for applications that require an additional layer of security such as cyber protection using a physical vault, allowing for communication between the host at a production site and the host at a vault site without the need for TCP/IP connectivity. The Symmetrix™ File System (SFS) on PowerMax™ available from Dell™ is an example storage medium for this secure communication mechanism. Any storage medium locally attached to the host at the production site and remotely accessible from the host at the cyber recovery vault site may be used. As used herein, this storage medium is referred to as a controller-based file system. In some embodiments, as shown in FIGS. 3 and 4, the controller-based file system is resident at the production site DCx. In some embodiments, as shown in FIG. 7, the controller-based file system is resident at the cyber recovery vault CRy.

FIG. 3 is a block diagram of an example production site DCx configured to enable storage-based secure communication with a physical cyber recovery vault CRy, in which the storage-based secure communication system is hosted by the production site DCx, according to some embodiments.

For conciseness, the CPA source site is referred to herein as DCx, and the cyber recovery vault site is referred to herein as CRy.

In some embodiments, DCx is a regular production site as part of any multi-site Disaster Recovery (DR) solution configuration. It houses the CPA source devices 320 included in the cyber RDF groups, including optional local snapshot protection for the production RDF devices. The DR solution runs at DCx as a control system and will utilize a secure method of communication for exchanging information with a vault system running at CRy via a controller-based file system in the DCx storage array. In some embodiments, different types of messages are exchanged using this secure mechanism. One type of message will include the DR solution parameter file contents as well as a set of global variables, describing both the configuration definition and the configuration state. This will allow the cyber recovery vault system to participate in configuration parameter maintenance. Other types of messages will include all those that are necessary to allow the DR solution to manage a configuration that features cyber protection manager 315 running in the cyber recovery vault CRy.

In some embodiments, CRy is the cyber recovery vault site. A storage array at CRy houses the CPA target devices 320. A host at CRy performs cyber protection management and any state changes that affect devices in the RDF groups defined for cyber protection automation. CPM 315 will detect that it's running on a vault system. When running on a vault system, CPM will support the space-saving CPA implementation in the MSC-based modality or one of the data drain modalities (ADCOPY-DISK), depending on the configuration type and configuration state as discovered using the secure communication mechanism described herein.

As shown in FIG. 3, in some embodiments the disaster recovery solution on both the production site DCx and on the cyber recovery vault CRy includes a respective communication subtask 360$_P$, 360$_V$, configured to manage communications between the production site DCx and the cyber recovery vault CRy. In some embodiments, the communication subtasks 360$_P$, 360$_V$, are initialized at startup, if the control system 300 detects that the local system is part of a CPA implementation that has CPM defined to run on a vault system. In this case, the Disaster Recovery (DR) solution will start communication subtask 360$_P$ on the control system at DCx and also start a communication subtask 360$_V$ on the cyber recover vault CRy. At startup, communication subtask 360$_P$ at DCx and communication subtask 360$_V$ at CRy will exchange public keys using a temporary non-encrypted file 205 in the controller-based file system in the DCx storage array. These public keys will be used for encryption and signature verification of the control files 200 used for DR solution message exchange in the controller-based file system in the DCx storage array. In addition to being encrypted using the receiver's public key, these message exchange control files 200 will also be signed using the sender's private key to protect against an unauthorized actor exploiting the receiver's public key to encrypt their own messages.

Communication subtask 360$_P$ running at DCx will regularly write the DR solution parameter file contents (as well as a checksum) and a set of global variables to one or more encrypted control files 200 in the controller-based file system that is dedicated for that purpose in the DCx storage array. This will be done at DR solution initialization time and any time a change to the configuration type or configuration state is detected. Communication subtask 360$_P$ running at DCx will write other messages (e.g., DR solution configuration management and heartbeat) to other encrypted control files 200 in the controller-based file system in the DCx storage array.

The communication subtask 360$_V$ running at CRy will regularly check for updates to the encrypted control files 200 in the controller-based file system in the DCx storage array, driven by CPM 315 whenever a new vault snapshot is due, for example based on the state of an airgap, or the specified snapshot creation interval, or according to a particular schedule. Based on the contents of these files, CPM 315 will behave as follows:

If CPM 315 on the cyber recovery vault CRy finds that any of the encrypted files have been tampered with in any way, CPM 315 on the cyber recovery vault CRy will consider the production site to be compromised and suspend snapshot creation in the cyber recovery vault CRy to avoid the possibility of creating snapshots of corrupted data. CPM 315 on the cyber recovery vault CRy will also issue repeated alerts to the console on the cyber recovery vault system.

If CPM 315 on the cyber recovery vault CRy finds that the encrypted DR solution heartbeat file has not been updated for a particular number of times, for example the heartbeat file has not been updated for two or more consecutive heartbeat intervals (specified by the user), CPM 315 on the cyber recovery vault CRy will suspend snapshot creation in the cyber recovery vault since it can no longer be sure it has valid state information. CPM 315 on the cyber recovery vault CRy will also issue repeated alerts to the console on the cyber recovery vault system.

If CPM 315 on the cyber recovery vault CRy finds that the DR solution parameter file contents have been changed (i.e., parameter refresh at DCx), CPM 315 on the cyber recovery vault CRy will update the local parameter file and execute a parameter refresh at CRy.

If CPM 315 on the cyber recovery vault CRy finds that DCx is a frozen site (data is not changing), CPM 315 on the cyber recovery vault CRy will suspend snapshot creation in the cyber recovery vault CRy.

If CPM 315 on the cyber recovery vault CRy finds that DCx source volumes are the target of SRDF/A, CPM 315 on the cyber recovery vault CRy will limit CPA functionality to the data drain or data drain with intermittent consistency modality in instances where cascaded SRDF/A→SRDF/A remote data replication is not supported by the storage systems.

If CPM 315 on the cyber recovery vault CRy finds that DCx is not frozen and finds that DCx source volumes are not the target of SRDF/A, CPM 315 on the cyber recovery vault CRy will provide CPA functionality in the SRDF/A+MSC-based modality.

FIG. 4 is a block diagram of the example production site and cyber recovery vault site of FIG. 3, and shows example ways of communicating between the production site DCx and cyber recovery vault CRy using a storage-based secure communication system, according to some embodiments. As shown in FIG. 4, in some embodiments the communication subtask 360$_V$ on the cyber recovery vault CRy writes its public encryption key to a key exchange file 205 in the controller-based file system of the production site DCx (FIG. 4, Arrow 1). Similarly, communication subtask 360$_P$ on the production site DCx writes its public encryption key to the key exchange file 205 in the controller-based file system of the production site DCx (FIG. 4, Arrow 2). Communication subtask 360$_V$ on the cyber recovery vault CRy then reads production site DCx public encryption key from key exchange file 205 in the controller-based file system of the production site DCx (FIG. 4, Arrow 1). Similarly, communication subtask 360$_P$ on the production site DCx then reads cyber recovery vault CRy public encryption key from key exchange file 205 in the controller-based file system of the production site DCx (FIG. 4, Arrow 2). Once public keys have been exchanged, in some embodiments the key exchange file 205 is temporary and may be deleted.

Public-key cryptography, or asymmetric cryptography, is a cryptographic system in which participants use pairs of related keys. Each key pair includes a public key and a corresponding private key. The keys are generated using cryptographic algorithms based on one-way functions. Security of public-key cryptography depends on keeping the private key secret. The public key can be openly distributed without compromising security. Specifically, in a public-key encryption system, anyone with a copy of a participant's public key can encrypt a message, yielding a ciphertext, but only the participant that knows the corresponding private key can decrypt the ciphertext to obtain the original message. Similarly, public/private key cryptography can be used to create digital signatures. To create a digital signature, a participant that wants to sign a message creates a digital signature of the message using their private key. Anyone with the corresponding public key can verify whether the signature matches the message, but a forger who does not know the private key cannot find any message/signature pair that will pass verification with the public key.

In some embodiments, public/private key encryption is used to secure communications that are written by communication subtask 360$_P$ on production site DCx to ensure that only the communication subtask 360$_V$ on cyber recovery vault CRy is able to read the content of control file 200 contained in the controller-based file system, and to enable the cyber recovery vault CRy to ensure that the communication subtask 360$_P$ on the production site DCx is the provenance of the content of the control file 200.

After exchanging public keys (arrows 1 and 2), communication subtask 360$_P$ on production site DCx writes status updates to control files 200 in the controller-based file system in the DCx storage array (FIG. 4, Arrow 3). The control files 200 are encrypted by communication subtask 360$_P$ on production site DCx using cyber recovery vault's public key. Periodically, communication subtask 360$_V$ on cyber recovery vault CRy reads encrypted control files 200 in the controller-based file system in the DCx storage array (FIG. 4, Arrow 4). It should be noted that the control files 200, in some embodiments, are files created in a controller-based file system that is accessible to hosts that are locally connected to the storage system 100 or that are remotely connected to the storage system 100. Accordingly, the control files 200 are writable and readable by hosts connected to both production site DCx as well as to cyber recovery vault site CRy.

In some embodiments, communication subtask 360$_V$ on the cyber recovery vault CRy connects to the control files 200 as a remotely located host over the RDF links 250 to read encrypted control files 200. By causing the communication subtask 360$_P$ on production site DCx to write updates to the encrypted control files 200, and causing the subtask 360$_V$ on cyber recovery vault CRy to read updates from the encrypted control files 200, it is possible to enable communication subtask 360$_P$ on production site DCx to communicate with the communication task 360$_V$ on the cyber recovery vault CRy without requiring a separate communication channel between the two sites. Accordingly, it is possible to eliminate any need for a separate communication channel, such as a TCP/IP connection between the production site DCx and cyber recovery vault CRy, thus eliminating a potential avenue of attack against the cyber recovery vault CRy to increase the security of the disaster recovery solution.

In some embodiments, the communication task $360_P$ on the production site DCx uses system calls (syscalls) to write overall disaster recovery configuration to the secure control files 200 and to write heartbeat messages to the secure control files 200. In some embodiments, communication task $360_P$ on the production site DCx writes both disaster recovery configuration information and the heartbeat messages to the same secure control file 200. In some embodiments, communication task $360_P$ on the production site DCx writes disaster recovery configuration information and the heartbeat messages to different secure control files 200. In embodiments where the same secure control file 200 is used for both disaster recovery configuration information and heartbeat message storage, the cyber recovery vault issues remote syscalls to the operating system 150 on the storage system 100 associated with the production site DCx to read the control file 200 containing the disaster recovery configuration information and heartbeat messages. In embodiments where different secure control files 200 are used to store disaster recovery configuration information and heartbeat message storage, the cyber recovery vault issues remote syscalls to the operating system 150 on the storage system 100 associated with the production site DCx to read the control file 200 containing the disaster recovery configuration information and to read the control file 200 containing the heartbeat messages.

In some embodiments, communication subtask $360_V$ on cyber recovery vault CRy is also able to write to one or more of the control files 200 on the controller-based file system of storage system 100. In some embodiments, the communication subtask $360_V$ on cyber recovery vault CRy writes to the same secure control files 200 that are used by the communication subtask $360_P$ on the production site DCx. In some embodiments, the communication subtask $360_V$ on cyber recovery vault CRy writes to one or more secure control files 200 other than the secure file control file 200 that is used by the communication subtask $360_P$ on the production site DCx. Example messages that might be written by the communication subtask $360_V$ on cyber recovery vault CRy include items such as a read acknowledgement message, disaster recovery configuration change confirmation, failure information, alert messages, snapset creation acknowledgments, and any other information that may be useful to be communicated from the cyber recovery vault CRy to the production site DCx.

In some embodiments, control files 200 that are used to communicate information from the production site DCx to the cyber recovery vault CRy, and or that are used to communicate information from the cyber recovery vault CRy to the production site DCx, are encrypted and signed. For example, in some embodiments when the communication subtask $360_P$ on production site DCx writes to a control files 200, the control files 200 is encrypted using CRy's public encryption key and digitally signed to create a digital signature using production site DCx's private encryption key. When communication subtask $360_V$ on cyber recovery vault CRy reads the control files 200, the communication subtask $360_V$ on cyber recovery vault CRy decrypts the control files 200 using cyber recovery vault CRy's private encryption key, and validates the digital signature using production site DCx's public encryption key. In this manner, the cyber recovery vault CRy is able to both read the information contained in the encrypted control files 200 and validate that the information contained in the encrypted file was signed by the communication subtask $360_P$ on production site DCx. Using cyber recovery vault CRy's public encryption key to encrypt the control files 200 prevents other hosts from reading information about the disaster recovery configuration. Using production site DCx's private encryption key to sign the secure control files 200 prevents other hosts from writing information to encrypted control files 200 to prevent the other hosts from altering the disaster recovery configuration.

FIG. 5 is a flow chart of an example method of using storage-based secure communication system to enable communication between a production site DCx and a cyber recovery vault CRy, according to some embodiments. As shown in FIG. 5, in some embodiments a multi-site disaster recovery solution, including a production site DCx and a cyber recovery vault site CRy, are connected by Remote Data Forwarding (RDF) links 250 (block 500). In some embodiments, the RDF links 250 are airgapped, meaning that connectivity on the RDF links is intermittently activated and intermittently deactivated.

As shown in FIG. 5, a first instance of a communication subtask $360_P$ is started on the production site DCx (block 505), and a second instance of a communication subtask $360_V$ is started on the cyber recovery vault site CRy (block 510). The communication subtask $360_P$ on the production site DCx stores a copy of the production site DCx's public encryption key in a key exchange file 205 used for public key exchange in the disaster recovery solution (block 515). In some embodiments, the key exchange file 205 is implemented as a file within a controller-based file system on the production site DCx. Similarly, communication subtask $360_V$ on the cyber recovery vault CRy stores a copy of the cyber recovery vault CRy's public encryption key in the key exchange file 205 (block 520). In some embodiments, the same key exchange file 205 is used by both the production site DCx and cyber recovery vault CRy to store their respective public keys. In some embodiments, different key exchange files 205 are used by the production site DCx and cyber recovery vault CRy to store their respective public keys. The communication subtask on the production site DCx reads the cyber recovery vault CRy's public encryption key from the key exchange file 205 (block 525). The communication subtask on the cyber recovery vault CRy reads the production site DCx's public encryption key from the key exchange file 205 (block 530). Optionally, after exchanging public keys, the key exchange file 205 may be deleted.

Whenever the configuration of the remote data forwarding solution changes, for example if the production site DCx switches from being in a primary region to being in a backup region or if the type of modality used to implement remote data forwarding on the RDF links 250 changes, the communication subtask creates disaster recovery configuration updates (block 535) that are written to one of the control files 200 contained in the controller-based file system (block 540). Similarly, in some embodiments the communication subtask $360_P$ periodically creates heartbeat messages (block 535) that are written one of the control files 200 (block 540). In some embodiments, the communication subtask on DCX writes the heartbeat messages to one or more communication control files 200 that are encrypted using CRy's public encryption key and signed using DCx's private encryption key (block 540).

As shown in FIG. 5, in some embodiments the communication system $360_V$ on the cyber recovery vault CRy waits for occurrence of a read event (a determination of YES at block 545). Example read events might include closing of an airgap on RDF links 250 to enable the RDF links 250 to be used to communicate between production site DCx and cyber recovery vault CRy. In a non-airgapped solution, an example read event might include expiration of a timer. In some embodiments, read events by the communication system $360_V$ on cyber recovery vault CRy are asynchronous from write events by the communication system $360_P$ on production site DCx.

In some embodiments, read events by the communication system $360_V$ on cyber recovery vault CRy are asynchronous from write events by the communication system $360_P$ on production site DCx, but are partially coordinated. For example, in some embodiments, a separate communication mechanism such as a TCP/IP link or RDF links 250 may be used by the production site DCx to transmit a signal such as a PING or message to the cyber recovery vault CRy to notify the cyber recovery vault CRy that an update has been added to the control file 200. In some embodiments, receipt of the signal or message is interpreted by the cyber recovery vault as an additional type of read event (a determination of YES at block 545), but the signal or message contains no other information that may be used to modify the disaster recovery solution or otherwise affect operation of the cyber recovery vault CRy.

Upon occurrence of a read event (a determination of YES at block 545), the communication subtask $360_V$ on cyber recovery vault CRy reads the control file 200. In some embodiments, the communication subtask $360_V$ on cyber recovery vault CRy decrypts the control file 200 using CRy's private encryption key and verifies the signature of the control file 200 using production site DCx's public encryption key (block 550). Any configuration changes that are communicated using the storage-based secure communication system are then implemented by the control system 300 on the cyber recovery vault CRy.

Figure 6:
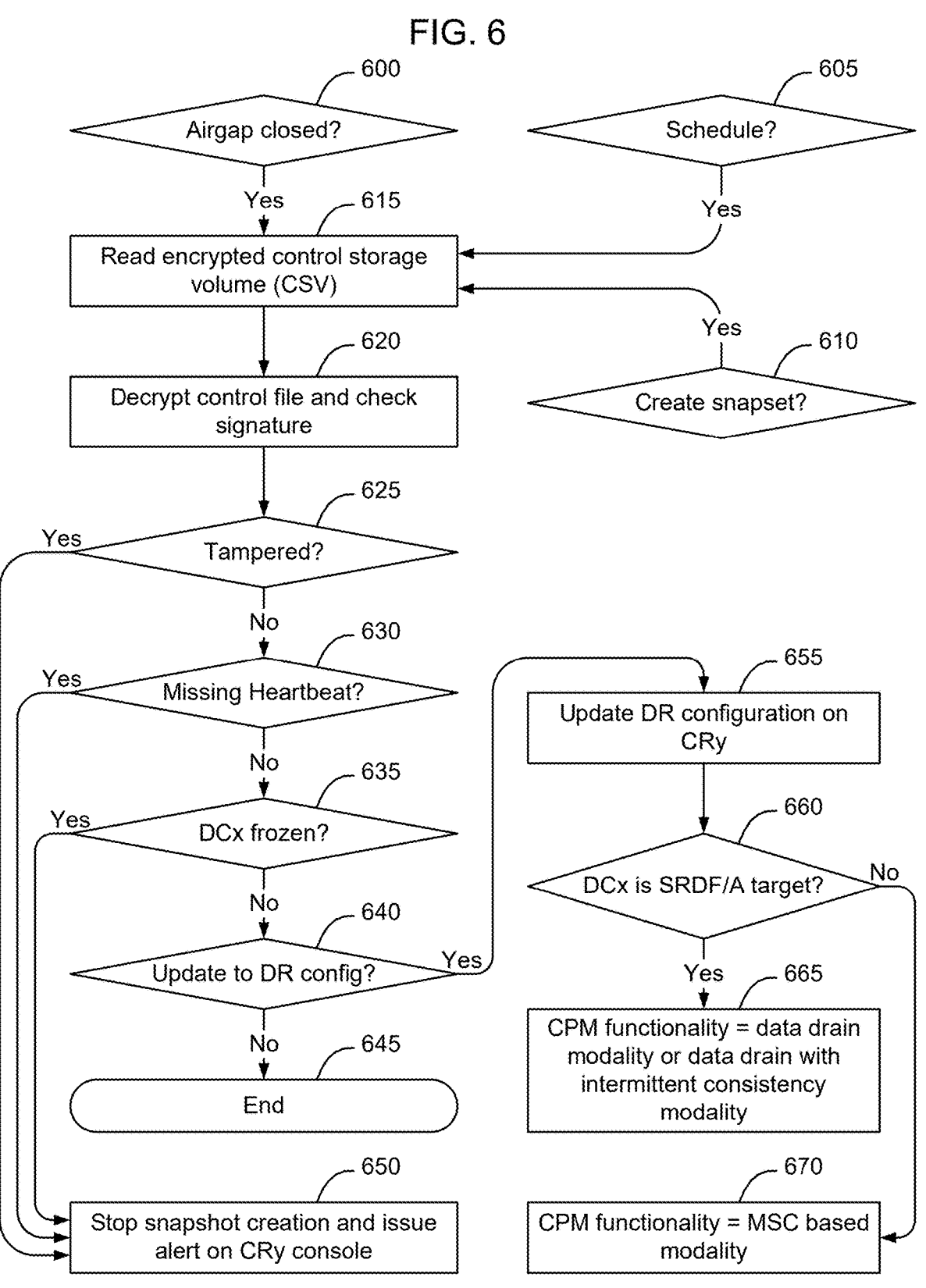
FIG. 6 is a flow chart of an example method of processing control information by a cyber recovery vault CRy received by the cyber recovery vault using a storage-based secure communication system, according to some embodiments.

FIG. 6 is a flow chart of an example method of processing control information by a cyber recovery vault CRy received by the cyber recovery vault using a storage-based secure communication system, according to some embodiments. As shown in FIG. 6, in some embodiments upon occurrence of a read event, the communication subtask $360_V$ on cyber recovery vault CRy reads the control file 200 (block 615). Example illustrated read events in FIG. 6 include a determination that the airgap has been closed (block 600), expiration of a particular amount of time (block 605), or in connection with creation of a snapset (block 610). Other read events may be used as well, and the selection of read events shown in FIG. 6 is intended to be merely one example. The particular set of read events may depend on the particular implementation.

In response to determination of occurrence of a read event (a determination of YES at block 600, 605, or 610), the communication subtask $360_V$ on cyber recovery vault CRy reads the control file 200 (block 615). The communication subtask $360_V$ on cyber recovery vault CRy decrypts the control file 200 and checks the signature of the control file 200 (block 620). The communication subtask $360_V$ on cyber recovery vault CRy then implements a series of checks prior to implementing any actions based on the content of the control file 200.

In some embodiments, one of the series of checks implemented by the communication subtask $360_V$ on cyber recovery vault CRy is to see if the control file has been tampered (block 625). In some embodiments the communication subtask $360_V$ on cyber recovery vault CRy determines that the control file has been tampered in instances where the communication subtask $360_V$ on cyber recovery vault CRy is not able to verify the digital signature or where the control file was encrypted using a public key other than CRy's public key. In response to a determination that the control file has been tampered (a determination of YES at block 625), in some embodiments CPM 315 on cyber recovery vault CRy stops snapshot creation and issues an alert on a console connected to the cyber recovery vault CRy (block 650). In some embodiments, communication subtask $360_V$ running in the cyber recovery vault CRy includes artificial intelligence to provide intelligent messaging to the user about the state of the cyber protection and cyber protection automation.

In some embodiments, rather than stopping snapshot creation (block 650), CPM 315 on cyber recovery vault CRy continues to make snapshots, but flags the snapshots that are created after determining that the control file was tampered. By continuing to make snapshots of the storage volumes 320, a rogue actor is not able to interfere with the protection provided by the cyber recovery vault merely by tampering with the control file 200, such as by writing to the control file or re-encrypting the control file 200.

In some embodiments, one of the series of checks implemented by the communication subtask $360_V$ on cyber recovery vault CRy is to see if the control file is missing a select number of consecutive heartbeat messages (block 630). In response to a determination that the select number of consecutive heartbeat messages have not been written to the control files 200 (a determination of YES at block 630), CPM 315 on cyber recovery vault CRy stops snapshot creation and issues an alert on a console connected to the cyber recovery vault CRy (block 650). In some embodiments, the select number of consecutive heartbeat messages is two of more consecutive heartbeat messages, although the particular number of consecutive heartbeat messages will depend on the particular implementation.

In some embodiments, one of the series of checks implemented by the communication subtask $360_V$ on cyber recovery vault CRy is to determine whether the production site DCx is frozen (block 630). In response to a determination that the production site DCx is frozen (a determination of YES at block 635), CPM 315 on cyber recovery vault CRy stops snapshot creation and issues an alert on a console connected to the cyber recovery vault CRy (block 650).

Although FIG. 6 shows the series of checks (blocks 625, 630, and 635) implemented consecutively, it should be understood that the series of checks (blocks 625, 630, and 635) may be executed in parallel. Further, it should be understood that the series of checks (blocks 625, 630, and 635) may be executed in any desired order and the particular order in which the series of checks is executed will therefore depend on the particular implementation. Additional and/or alternative checks may also be implemented, depending on the particular implementation.

In some embodiments, when the communication subtask $360_V$ on cyber recovery vault CRy has completed the series of checks to verify the veracity and provenance of the content of the control file (blocks 625, 630, and 635), the subtask $360_V$ on cyber recovery vault CRy determines if the control file contains an update to the disaster recovery configuration (block 640). In response to a determination that the control file does not contain an update to the disaster recovery configuration (a determination of NO at block 640), no changes are required to be implemented on the cyber recovery vault CRy and the process ends (block 645).

In response to a determination that the control file does contain an update to the disaster recovery configuration (a determination of YES at block 640), the disaster recovery solution 350 on the cyber recovery vault CRy is updated according to the information contained in the control file 200 (block 655). For example, in some embodiments the CPM 315 on the cyber recovery vault CRy will determine whether the storage volumes 320 on the production site DCx are the target of SRDF/A (block 660). In some embodiments, when the storage volumes 320 on the production site DCx are the R2 target an upstream R1/R2 Data Replication Facility, and SRDF/A is being used on that upstream Data Replication Facility, the modality used to implement RDF links 250 is not allowed to be SRDF/A because cascading SRDF/A→S-RDF/A is not supported. Accordingly, in response to a determination that storage volumes 320 on the production site DCx are the R2 target of SRDF/A Data Replication Facility (a determination of YES at block 660), the cyber recovery vault CRy sets the modality on the RDF links to data drain or data drain with intermittent consistency (block 665). In response to a determination that storage volumes 320 on the production site DCx are not the R2 target of SRDF/A Data Replication Facility (a determination of NO at block 660), the cyber recovery vault CRy sets the modality on the RDF links to SRDF/A with MSC (block 670).

Although FIGS. 3 and 4 show the control file 200 and key exchange file 205 implemented in a controller-based file system of storage system 100 on production site DCx, it should be understood that in some embodiments the control file 200 and key exchange file 205 may instead or in addition be implemented in an accessible controller-based file system of the storage system implementing cyber recovery vault CRy. For example, as shown in FIG. 7, in some embodiments the storage-based secure communication system is hosted by the cyber recovery vault CRy rather than being implemented on the production site DCx. In an airgapped solution, when the RDF links 250 come online at the production site DCx, the communication subtask 360$_P$ on production site DCx will write configuration update messages and heartbeat messages to the control file 200 on the cyber recovery vault CRy, thus enabling the communication subtask 360$_V$ on the cyber recovery vault CRy to locally read from the control file 200 contained in its controller-based file system rather than reading from the control file 200 from the controller-based file system on the production site DCx over the RDF links 250.

Additionally, although FIGS. 3 and 4 show a single production site DCx connected to a single cyber recovery vault CRy, it should be understood that any number of production sites DCx may be connected to any number of cyber recovery vaults CRy. Where there are multiple production sites DCx and/or cyber recovery vaults CRy, separate control files 200 may be used to communicate between different pairs of sites. The control files 200 may be centrally located in one of the production sites DCx, may be stored in a distributed manner, for example by being respectively located on controller-based file systems of the production sites where the respective cyber recovery vault CRy connects to the disaster recovery system, or may be stored in any other convenient manner.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium.

The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present description.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of using a storage-based secure communication system to communicate between a production site and a cyber recovery vault on a data replication facility, comprising:

writing control information to a control file by a first communication subtask on the production site;

encrypting the control file, by the first communication subtask on the production site, using a cyber recovery vault public key, to create an encrypted control file;

digitally signing the encrypted control file, by the first communication subtask on the production site, using a production site private key to create a control file digital signature;

reading the encrypted control file by a second communication subtask on the cyber recovery vault;

decrypting the encrypted control file, by the second communication subtask on the cyber recovery vault, using a cyber recovery vault private key, to recreate the control file;

verifying the control file digital signature, by the second communication subtask on the cyber recovery vault, using a production site public key; and in response to a determination that the control file digital signature is valid and that the control file is able to be recreated by decrypting the encrypted control file using the cyber recovery vault private key, implementing control operations on the cyber recovery vault in accordance with control information contained in the control file.

2. The method of claim 1, wherein the control file is a set of one or more files implemented in a controller-based file system.

3. The method of claim 2, wherein the controller-based file system is an accessible file system that is accessible by both the production site and the cyber recovery vault, whereby communication between the production site and the cyber recovery vault is restricted to remote data forwarding links between a storage system at the production site and a storage system at the cyber recovery vault site.

4. The method of claim 3, wherein the controller-based file system is implemented on the production site.

5. The method of claim 3, wherein the controller-based file system is implemented on the cyber recovery vault.

6. The method of claim 2, further comprising implementing public key exchange between the production site and the cyber recovery vault, the public key exchange comprising:

writing the production site public key by the first communication subtask on the production site to a key exchange file in the controller-based file system;

writing the cyber recovery vault public key by the second communication subtask on the cyber recovery vault to the key exchange file in the controller-based file system;

reading the cyber recovery vault public key by the first communication subtask on the production site from the key exchange file in the controller-based file system; and reading the production site public key by the second communication subtask on the cyber recovery vault from the key exchange file in the controller-based file system.

7. The method of claim 6, further comprising deleting the key exchange file after implementing the public key exchange between the production site and the cyber recovery vault.

8. The method of claim 1, wherein the control information specifies a data replication modality to be used to transmit data on a set of one or more remote data forwarding links between the production site and the cyber recovery vault on the data replication facility; and wherein implementing control operations on the cyber recovery vault in accordance with control information contained in the control file comprises changing the data replication modality used to transmit data on the set of one or more remote data forwarding links to match the control information.

9. The method of claim 1, further comprising:

creating snapsets of storage volumes in the cyber recovery vault at a predetermined cadence; and in response to a determination that the control file digital signature is not valid or that the control file is not able to be recreated by decrypting the encrypted control file using the cyber recovery vault private key, pausing creation of the snapsets of the storage volumes in the cyber recovery vault.

10. The method of claim 1, wherein the control information further contains heartbeat information, the method further comprising:

creating snapsets of storage volumes in the cyber recovery vault at a predetermined cadence;

determining whether a recent portion of the heartbeat information is absent from the control information and, in response to a determination that the recent portion of the heartbeat information is absent from the control information, pausing creation of the snapsets of the storage volumes in the cyber recovery vault.

11. A system for using a storage-based secure communication system to communicate between a production site and a cyber recovery vault on a data replication facility, comprising:

one or more processors and one or more storage devices storing instructions that are operable, when executed by the one or more processors, to cause the one or more processors to perform operations comprising:

writing control information to a control file by a first communication subtask on the production site;

encrypting the control file, by the first communication subtask on the production site, using a cyber recovery vault public key, to create an encrypted control file;

digitally signing the encrypted control file, by the first communication subtask on the production site, using a production site private key to create a control file digital signature;

reading the encrypted control file by a second communication subtask on the cyber recovery vault;

decrypting the encrypted control file, by the second communication subtask on the cyber recovery vault, using a cyber recovery vault private key, to recreate the control file;

verifying the control file digital signature, by the second communication subtask on the cyber recovery vault, using a production site public key; and in response to a determination that the control file digital signature is valid and that the control file is able to be recreated by decrypting the encrypted control file using the cyber recovery vault private key, implementing control operations on the cyber recovery vault in accordance with control information contained in the control file.

12. The system of claim 11, wherein the control file is a set of one or more files implemented in a controller-based file system.

13. The system of claim 12, wherein the controller-based file system is an accessible file system that is accessible by both the production site and the cyber recovery vault, whereby communication between the production site and the cyber recovery vault is restricted to remote data forwarding links between a storage system at the production site and a storage system at the cyber recovery vault site.

14. The system of claim 13, wherein the controller-based file system is implemented on the production site.

15. The system of claim 13, wherein the controller-based file system is implemented on the cyber recovery vault.

16. The system of claim 12, the operations further comprising implementing public key exchange between the production site and the cyber recovery vault, the public key exchange comprising:

writing the production site public key by the first communication subtask on the production site to a key exchange file in the controller-based file system;

writing the cyber recovery vault public key by the second communication subtask on the cyber recovery vault to the key exchange file in the controller-based file system;

reading the cyber recovery vault public key by the first communication subtask on the production site from the key exchange file in the controller-based file system; and reading the production site public key by the second communication subtask on the cyber recovery vault from the key exchange file in the controller-based file system.

17. The system of claim 16, the operations further comprising deleting the key exchange file after implementing the public key exchange between the production site and the cyber recovery vault.

18. The system of claim 11, wherein the control information specifies a data replication modality to be used to transmit data on a set of one or more remote data forwarding links between the production site and the cyber recovery vault on the data replication facility; and wherein implementing control operations on the cyber recovery vault in accordance with control information contained in the control file comprises changing the data replication modality used to transmit data on the set of one or more remote data forwarding links to match the control information.

19. The system of claim 11, the operations further comprising:

creating snapsets of storage volumes in the cyber recovery vault at a predetermined cadence; and in response to a determination that the control file digital signature is not valid or that the control file is not able to be recreated by decrypting the encrypted control file using the cyber recovery vault private key, pausing creation of the snapsets of the storage volumes in the cyber recovery vault.

20. The system of claim 11, wherein the control information further contains heartbeat information, the operations further comprising:

creating snapsets of storage volumes in the cyber recovery vault at a predetermined cadence;

determining whether a recent portion of the heartbeat information is absent from the control information and, in response to a determination that the recent portion of the heartbeat information is absent from the control information, pausing creation of the snapsets of the storage volumes in the cyber recovery vault.

* * * * *